Sept. 9, 1958         R. KAPLAN ET AL         2,851,372
COATED METAL SHEET AND METHOD OF MAKING THE SAME
Filed Aug. 14, 1946
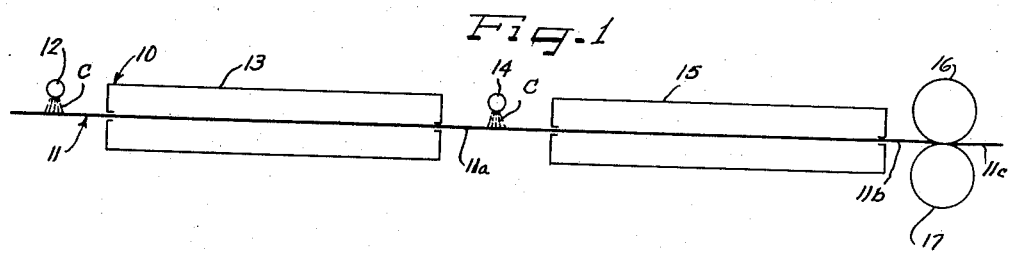
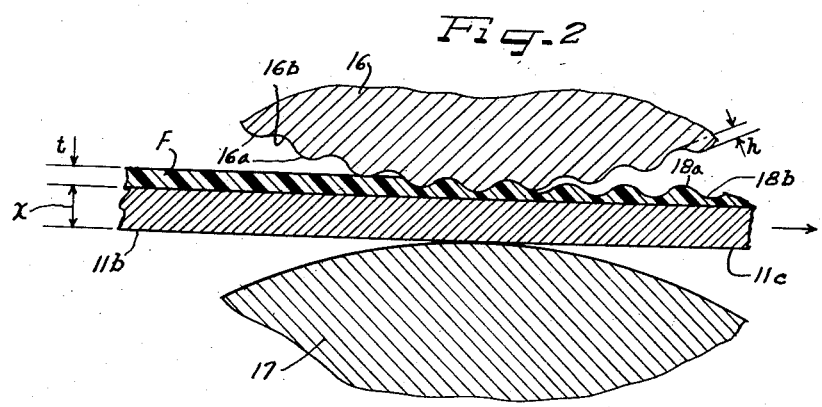
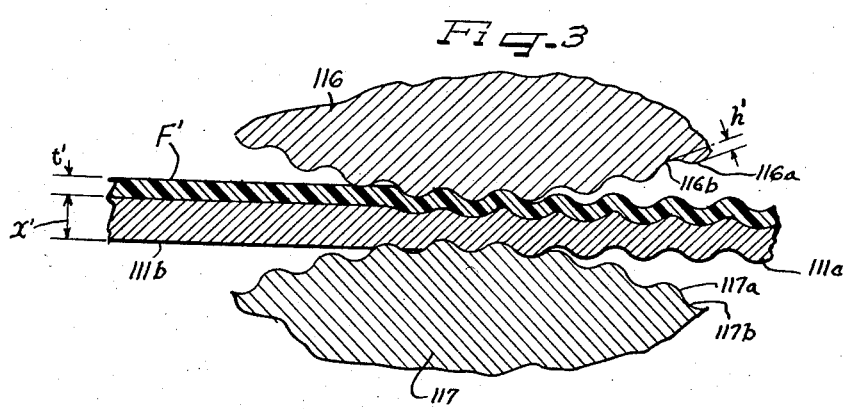
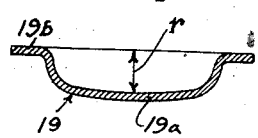
Inventors
ROBERT KAPLAN
EDWARD N. SIENKO United States Patent Office 2,851,372
Patented Sept. 9, 1958

2,851,372

COATED METAL SHEET AND METHOD OF MAKING THE SAME

Robert Kaplan, Chicago, and Edward N. Sienko, Clarendon Hills, Ill., assignors to Sun Steel Company, Chicago, Ill., a corporation of Illinois Application August 14, 1956, Serial No. 603,903

5 Claims. (Cl. 117—8)

This invention relates to the treatment of coated metal sheets and products obtained thereby, and more particularly, to the treatment of metal sheets coated with thermoplastic coating materials, and products obtained thereby, which may be used for decorative or structural purposes.

The instant invention is particularly concerned with the handling of coated carbon steel sheets and coated sheets of the so-called rust-resistant metals (i. e. copper, aluminum, stainless steel, etc.), although the instant invention may be used with any type of metal sheet, particularly any type of metal sheet that possesses cold formability at least as good as the carbon steel sheets here employed. The rust-resistant metals have been used in sheet form for decorative purposes and/or structural purposes for a number of years. The rust-resistant sheets such as aluminum and stainless steel sheets have also been embossed in small strips to provide ornamental sheets. These sheets have been coated, after they are embossed, with various coating materials and, although the coating materials appear to be rather well "anchored" because of the irregular embossed surfaces of these metals problems are often presented in connection with completeness of the coating or continuity of the coating because of the many fine grooves or cuts in the embossed metal. Adherence of the coatings is sometimes impaired also because of bending of the embossed materials.

In addition, the instant invention is concerned with the so-called "coined" thermoplastic coatings on sheet metal, wherein embossing of the coating only is accomplished and the metal sheet itself is not deformed. Heretofore, such a coating was first produced in the form of a thin coherent separate film which was embossed to the extent desired and this film was then caused to adhere to the sheet metal by the use of adhesives. The adherence between such coatings and the base sheet metal has, however, left something to be desired, when the base metal is subjected to differences in temperature and/or is bent or otherwise formed. The instant invention resides in part in the concept of applying the thermoplastic coating to the base metal (then heating the same to its fusion temperature and cooling), and then embossing or "coining" only the coating itself (without deformation of the metal sheet), so as to obtain distinctly superior adherence between the coating and the base metal. The instant invention also resides in the application of the thermoplastic coating to the base metal sheet, followed by heating of the coating to approximately its fusion temperature for a brief period then cooling, and then embossing the coated sheet so as to deform only the coating or to deform both the coating and the metal sheet. In either case superior adherence between the coating and the sheet is obtained.

To the best of our knowledge, others in the industry have not heretofore embossed carbon steel sheet. The problems of applying a coating to a sheet so as to obtain adequate adhesion therebetween for most purposes have also not been solved by prior workers in the art. As will be appreciated, this is particularly important with respect to carbon steel, because carbon steel is not a rust-resistant metal and a coating applied thereto should provide protection against corrosion as well as the desired ornamental effect.

As is well known, there are a number of other problems involved in the handling of sheet steel, usually in the form of hot rolled sheets of carbon steel, i. e., steel wherein the principal alloying element is carbon or steel of the SAE 1000 series. One of the properties of particular importance in the SAE 1000 series steel is cold formability. Cold forming or cold working of steel is contrasted to hot working in that the mechanical treatment of steel in such working is carried out below the critical range. The cold working of steel involves a number of operations including cold forming, which may involve merely bending or stamping, or which may involve the relatively more difficult operation of drawing.

In drawing, a generally flat sheet of metal is subjected to bending combined with a shearing force, but the metal having good drawing quality yields to the shearing force to the extent that it is deformed in drawing rather than being sheared or cut. If a metal is too brittle it breaks in such an operation. The metals used in the practice of the instant invention are no more brittle than the carbon steel sheet here employed and preferably are substantially less brittle. In general drawing involves the formation of a dish-shaped article from a generally flat metal sheet and this operation is contrasted to mere stamping or bending in that the metal having deep drawing quality is capable of being drawn perhaps four inches using a piece one square foot in area. Extra deep drawing may involve the formation of as much as an eight inch depression in a one square foot sheet of metal.

It is also well known that the concentration of forces is so great in the cold drawing operation that metallurgical changes are effected in certain steels, usually to the extent that brittleness may be imparted to high carbon steels. On the other hand, high carbon steels such as SAE 1020 have increased rigidity or strength so as to resist cold drawing and make the operation much more difficult from the point of view of forces applied as well as wear and tear on the dies. In general, it has been the practice in industry for some time to use carbon steels in the series SAE 1006 to SAE 1015 (i. e., having about 0.05–0.15% C and about 0.30–0.60% Mn) for drawing automobile body and fender stocks, lamps, oil pans, and a number of other deep drawing operations. Steel of this type, usually referred to as mild steel, possesses very good ductility or the ability to withstand cold deformation, but it possesses such ductility at a sacrifice in strength and rigidity.

Coatings applied to such carbon steels of the type which adhere rather well to the carbon steel tend to separate therefrom upon bending or subsequent treatment of the carbon steel, and particularly upon drawing or actual cold forming of the carbon steel. The same is true of coatings applied to the rust-resistant metal sheets which are subsequently cold formed or drawn. There are a vast number of coatings which may be applied to such metal sheets, but in general the coatings with which we are concerned are coatings which are formed of materials having a certain amount of deformability as contrasted to the very rigid porcelain enamel coatings, for example. Such coatings are generally recognized in the art as flexible or deformable coatings, such as resin coatings formed of synthetic resins alone or in paints or varnishes or the like. In our invention we also use thermoplastic resin coatings, because we have found that a preliminary heating step of the coating to approximately its fusion temperature is of critical importance in obtaining the desired adherence to the base metal. Such coatings are deformable at least to the extent that they are no more brittle than the carbon steel sheets here employed (or they are no more brittle in the form of thin coatings or films than the carbon steel sheet here employed). In the practice of the instant invention such coatings are actually softer than the carbon steel sheet and more readily deformable, since such coatings are synthetic resinous coatings which may be deformed without deformation of the base metal. Notwithstanding this fact, it appears that such coatings tend to separate from the metal backing when the same is bent or otherwise formed into a desired shape, if such coatings are not applied and embossed in the manner described herein.

The instant invention affords a solution to many problems confronting the workers in this art. A key to the instant invention resides in the concept of applying such thermoplastic deformable flexible coatings to the metal sheeting as an initial treatment, followed first by a baking or heating operation wherein the coating is briefly raised to its fusion temperature, and then followed by embossing of the coating (with or without embossing of the sheet), before drawing and/or other secondary operations. The combination of heating and embossing of the coating itself apparently brings about a number of unique and important advantages, including distinctly superior adhesion between the coating and the metal sheet during working of the sheet, as well as changes in temperature of the sheet. Also, it appears that the resin coating develops additional hardness and toughness and resistance to wear and tear. When the metal sheet is also deformed in the embossing operation distinctly superior adherence is obtained during ordinary wear and tear as well as during a forming operation such as drawing.

An important object of the instant invention is to provide an improved method of applying coating to metal sheets, and further to provide an improved coated metal sheet and articles formed therefrom.

It is a further object of the instant invention to provide an improved method which comprises applying a thin coherent film of deformable thermoplastic coating material to a metal sheet, heating the coating on the sheet briefly to its fusion temperature, and then cooling the coating to just below its fusion temperature and embossing the coating.

Other objects, features and advantages of the instant invention will become apparent to those skilled in the art from the following detail disclosure thereof and the drawings attached hereto and made a part hereof.

On the drawings:

Figure 1 is a diagrammatic view showing generally the sequence of operations in the coating and embossing steps here employed;

Figure 2 is a fragmentary detail view in elevation (with parts shown in section) of one type of embossing operation embodying the instant invention;

Figure 3 is a detail fragmentary view in elevation with parts shown in section of another embossing operation embodying the instant invention; and Figure 4 is a sectional elevational view of an embossed coated sheet of the instant invention (such as that shown in Figure 3) which has been drawn to form a generally dish-shaped article.

As shown on the drawings:

In Figure 1, the reference numeral 10 indicates generally an arrangement for contiuously coating a metal sheet 11 which moves in the direction indicated by the arrow heads. The metal sheet 11, preferably in the form of a carbon steel sheet that is flat and of substantially uniform thickness is unwound from a suitable source (not shown) and fed past a coater 12, which is here shown as a device for spraying coating material $c$ onto the top of the sheet 11. The coating material $c$ is a sub-coat which is applied initially in the form of an extremely thin film.

Next, the sheet 11 coated with a sub-coat $c$ is passed through a furnace 13. In the preferred embodiment of the instant invention, the sub-coating $c$ is applied in the form of a concentrated (75%) mineral spirits solution of polyvinyl chloride in an amount sufficient to deposit a dried resin film on the sheet 11 at the exit of the furnace 13 of 0.0005 inch thickness. The sheet 11 is 18 gauge SAE 1010 sheeting. The sheet 11 with the coating $c$ thereon is passed through a furnace 13 approximately 40 feet in length at a speed of 15 feet per minute. The furnace is maintained at 350° F. which is the fusion temperature of the polyvinyl chloride resin. As will be appreciated, the coated sheet 11 is in the furnace 13 a relatively short period of time so that the resin is subjected to the fusion temperature only briefly. In this way, the resin reaches its fusion temperature and is converted momentarily to a viscous liquid, but it does not remain in this state sufficiently long to actually flow freely off the sheet 11, but rather it consolidates the film into a coherent uniformly thick resinous film.

At the exit of the furnace 13, the coated sheet 11a is immediately cooled, which may be accomplished by air cooling as herein indicated or by forced cooling by any of a number of known means. The sheet 11a has the sub-coat $c$ thereon in dry "cured" form and the sheet 11a is then passed beneath a second coater 14 which applies the same mineral spirits solution hereinbefore described onto the sheet 11a as a final coating material C. In this instance a sufficient amount of coating material C is applied to add a final film of coating material of 0.004 inch thickness. The sheet 11a is then passed through a second furnace 15 also 40 feet in length and also at a speed of 15 feet per minute. The furnace 15 is also maintained at 350° F. so as to effect briefly fusion of the resin, as well as complete removal of the mineral spirits. At the exit of the furnace 15 the final sheet 11b (with the sub-coat $c$ and the final coating C thereon) is cooled in this case again by exposure to the ambient atmosphere, although other known cooling means may be employed. The sheet 11b is cooled to approximately 300° F. and then passed between the embossing rolls 16 and 17 to obtain a final product 11c that is embossed. If adequate cooling of the coated sheet 11b cannot be accomplished by cooling in air or any equally simple means (which is usually the case in the relatively short space available) cooling water may be fed into the embossing rolls 16 and 17 so as to assure carrying out of the embossing at a temperature at least as low as 300° F. In general, the temperature should be 300° F. plus or minus 25°, at which forming of the resinous subcoat $c$ and final coating C may be easily carried out without the application of great pressures or the cutting of the film and also without the subsequent loss of the embossed impression by flow of the resin (if the resin is still too warm).

In general, the embossing step is carried out at 25 to 75° F. less than the fusion temperature of the resin for ideal operating conditions. The sub-coating applied is preferably 0.0001 to 0.001 inch. This sub-coating $c$ is relatively thin and obtains the full benefit of the heating operation in the furnace 13 so as to obtain optimum adherence and flow conditions within the furnace 13. Although it may be possible to apply the entire coating in a single operation, it has been found distinctly superior to apply a sub-coating first in the manner herein described and follow this with the thicker final coating C. It will also be appreciated that in prior art procedures wherein a thin coherent film of embossed material is caused to adhere to a metal backing sheet, the use of the temperatures herein employed would be impossible because the embossed configuration would be lost through even relatively slow flow of the resin at the furnace temperatures. In contrast, this slow flow of the resin at the furnace temperatures is here employed to obtain optimum operating conditions for adhesion of the resin. The resin may thus flow into each and every minor surface irregularity in the sheet 11 while the sheet passes through the furnace 13 and the final coating C in a furnace 15 may also flow so as to assure uniform coating thickness on the sheet 11 in the final product 11b. As will be appreciated the relatively small mass of coating c applied as the sub-coat can flow more freely and penetrate better each and every minor surface irregularity in the sheet 11, because the heat applied therto in the furnace 13 will more readily fluidize the resin. Because such a thin film is employed in the furnace 13, greater fluidization thereof does not cause actual flow of resin off of the sheet 11. On the other hand, the greater mass of the final coating C and the greater amount of solvent therein which must be removed prevents such extreme fluidization of the coating in the furnace 15, although it does permit a sufficient amount of flow to obtain a uniform film thickness and also to obtain mutual fusion of the sub-coat c and the main coat C which results in the film F indicated in Figure 2.

Referring now to Figure 2, it will be seen that the finally coated sheet 11b with the resin film F thereon passes between the embossing rolls 16 and 17. In the embodiment of Figure 2, the bottom roll 17 is a smooth roll which prevents deformation of the metal sheet 11b; whereas the top embossing roll 16 is provided with bosses 16a thereon. As will be appreciated, the bosses 16a can have any desired configuration or arrangement on the surface of the roll 16 so as to emboss or coin the desired pattern on the film F. In general, the bosses 16a are separated by valleys 16b on the surface of the roll 16 and the bosses 16a extend radially outwardly from the valleys 16b a distance $h$ ranging from about ¼ to about ¾ of the film thickness $t$, but as here shown the distance $h$ is one-half the film thickness $t$. The rolls 16 and 17 are spaced apart so that embossing takes place only on the film F and no deformation of the metal sheet 11b is obtained. The thickness $x$ of the metal sheet 11b may range from a maximum of about 0.1 inch to a practical minimum of about 0.01 inch. Preferably 18 gauge (0.05 inch thickness) or less is used. The resulting embossed coated sheet 11c is provided with corresponding bosses 18a and valleys 18b to conform with the contour of the surface of the embossing roll 16 and the embossing process results in additional adherence between the film F and the metal sheet 11c.

In carrying out the coating step in the practice of the instant invention it will be appreciated that any of a number of well known coating methods may be employed and any of a number of well known synthetic resinous coating materials may be employed, with or without pigments. In each case the thermoplastic coating materials are heated to substantially their fusion temperatures for a short period of time, such as 2 to 5 minutes, so as to obtain the desired cooperation between the coating materials and the metal base.

Referring now to Figure 3, it will be seen that elements therein corresponding to elements shown in Figure 2 are given the same reference numerals in the 100 series or are given the same reference letter in the primed series. In Figure 3 both the upper embossing roll 116 and the lower embossing roll 117 are provided with bosses 116a and 117a respectively with valleys 116b and 117b, respectively, spaced therebetween. The height of the bosses indicated as $h'$ for both rolls 116 and 117 is substantially the same and is about 0.010 to about 0.014 inch. The film thickness $t'$ and the metal sheet thickness $x'$ are the same as those given for Figure 2; but the height of the bosses $h'$ ranges from 1/10 to ½ of the overall thickness $x'$ plus $t'$ and is preferably 20 to 45% thereof. In this way deformation of the metal sheet 111b is accomplished as well as deformation of the film F'.

The embossing operation (with the possible exception of the overall pressures used) is substantially the same for each of the various coating materials and each of the various coated base sheets hereinbefore described. As indicated, carbon steel sheet is preferred for use in the practice of the instant invention. Such sheet may have about 0.05–0.30% C., and preferably has only about 0.30–0.90% Mn. This involves the steels within the range SAE 1006 to SAE 1030, except for SAE 1019, 1022, 1024 and 1027 which have higher Mn contents (of as much as 1.65% Mn). Preferably the Mn content is 0.25–0.60%, using C contents as high as 0.30%; and in many instances the greatest advantages of the instant invention are obtained using steels within the range SAE 1006 to SAE 1015 (0.05–0.15% C and 0.25–0.60% Mn).

The sheets 11c and 111c may be cold worked, as by bending or the like without separation of the films F and F', respectively, therefrom. In particular, the sheet 111c embossed on both sides may be used in a drawing operation to advantage. The drawing operation which is employed is, of course, a standard drawing operation of the type well known to those skilled in the art. The differences here involved include greater ease of drawing, apparently better lubrication between the die and the workpiece, less wear and tear on the die, a retention of the embossed contour of the workpiece during the drawing or forming operation, and a retention of the embossed contour of the coating on the base metal during the drawing or forming operation. In other respects, the drawing operation is the same as in an ordinary commercial operation. Drawing itself is a well known art and need not be described herein in detail. For the sake of distinguishing from ordinary bending, stamping or cutting operations, drawing could probably best be defined as involving the application of forces to the workpiece that are comparable to forces at least sufficient to make a 2 inch depression in a square foot of the workpiece sheet. Expressed in other terms, drawing involves the shaping of a sheet into a dish-shaped article or an article having a bowed contour; and the workers in the art generally consider a material has good deep drawing quality if it can be drawn 4 inches per square foot. The drawing operation itself involves applying suitably formed male and female dies to the sheet material under pressure (at less than the critical temperature for cold drawing) in order to effect deformation of the sheet to form the dish-shaped article.

Referring briefly to Figure 4, it will be seen that the embossed sheet such as the sheet 111c (Figure 3) may be drawn to form a generally dish-shaped panel member 19 wherein the central portion 19a is recessed about 4 inches as the dimension "$r$" indicates, and a flange-like portion 19b is retained around the periphery. The drawing operation is accomplished in an ordinary drawing press so as to provide a dish-shaped front panel member 19.

Among the coatings which may be employed in the practice of the instant invention those of the greatest significance are the natural and/or synthetic resin coatings. Among this group the so-called elastomers are preferred. The resin or plastic elastomers are well known materials to those skilled in the art possessing generally elastomeric properties comparable to that of natural rubber. Such elastomers include rubber, chlorinated rubber, rubber-synthetic resin admixtures, synthetic rubbers (i. e. butadiene-styrene, isoprene, chloroprene, butadiene-acrylonitrile copolymers), flexible (or saturated) polyester resins, vinyl chloride polymers, vinyl chloride-vinylidene chloride copolymers, vinyl chloride-vinyl acetate copolymers, and the like. These resin or elastomer coatings may be applied per se as by flame-spraying, which is particularly effective with polyethylene and polytetrafluoroethylene (which are well known elastomers), or the resins may be applied in solution in organic solvents with subsequent baking operations to remove the solvent, or the resins may be applied in emulsion form in aqueous media also the subsequent drying to remove the carrier. Solutions or emulsions of the resins may be applied by spraying, dipping, painting, or the like. Special treatments for the metal surface prior to the application of such resins may also be employed, such as the bonderizing, or Parkerizing processes. Pigments may be included or omitted as desired, but since decorative effect is an important feature in many uses of the invention, various colored pigments are usually included so that an elastomer base paint is preferred in many instances. Specific examples of coatings include the following:

(1) Vinyl chloride (95%)—vinylidene chloride (5%) commercial grade medium copolymer is applied from a mineral spirits solution to 18 gauge SAE 1010 sheeting by spraying on followed by baking at 350° F. to dry and cure the coating, in an operation which involves applying first 0.0005 inch of copolymer, followed by the subsequent application of 0.005 inch of copolymer and the procedure hereinbefore described and excllent adherence is obtained between the resulting films and the base metal sheet after embossing on the film side only or embossing on both sides.

(2) A sub-coating is applied to 20 gauge SAE 1010 sheeting in the form of 0.0005 inch of vinyl chloride (95%)—vinylidene chloride (5%) commercial grade medium copolymer which is baked at 350° F. to dry and cure the same, and a main coating of paint containing green pigments and the vinyl chloride vinylidene chloride medium copolymer is then applied in a film thickness of 0.004 inch followed by baking at 350° F. to dry and cure the coating. As indicated, the baking step in each case in the procedures of paragraphs (1) and (2) herein is carried out for three minutes.

(3) Polyethylene is flame-sprayed onto a 0.050 inch thick 18–8 stainless steel sheet to provide a sub-coating of 0.001 inch average thickness, which is heated to 425° F. for three minutes; and a second polyethylene coating of 0.005 inch average thickness is flame-sprayed on and baked for three minutes at 425° F.; and it is noted that superior adherence between the polyethylene coating and the metal backing is obtained after embossing both sides of the coated sheet (even though it is recognized that polyethylene has relatively poor adherence to any other material).

(4) A procedure is carried out that is the same as that described in paragraph (2) except that the resin used in the case of both coatings is vinyl chloride (95%)—vinyl acetate (5%) copolymer and the baking temperatures used are 325° F.

(5) Successive coatings of 0.0005 and 0.005 of commercial flexible polyester resin (i. e. ethylene glycol—propylene glycol-phthalate) in varnolene solution are painted onto 20 gauge SAE 1010 sheeting and successively baked for three minutes each at 250° F.

Each of the foregoing coated sheets is embossed on the film side in the manner hereinbefore described using an embossing roll having bosses thereon of an average height of 0.002 inch and on both sides using embossing rolls having bosses thereon of an average height of 0.012 inch and it is found that the embossed sheets may be bent back and forth without causing the resin coating thereon to crack or separate from the metal.

It will be understood that modifications and variations may be effected without departing from the spirit and scope of the novel concepts of the present invention.

We claim as our invention:

1. A method of producing a coated sheet metal stock capable of being cold formed which comprises applying a thin coherent film of deformable thermoplastic synthetic elastomeric resinous coating material to a metal sheet, heating the film on the sheet briefly to its fusion temperature to fuse the film together and onto the sheet, then cooling the film to below its fusion temperature, next applying to said film a layer of deformable thermoplastic synthetic elastomeric resinous coating material that is adherent to said film on the sheet and heating said layer briefly to its fusion temperature to accomplish mutual fusion of the layer and film, then cooling the layer to just below its fusion temperature, and finally pressure embossing the coating at just below its fusion temperature.

2. The method claimed in claim 1 wherein said film and said layer of the coating are each formed of polyethylene.

3. The method of claim 1 wherein said film and said layer of the coating are each formed of a polyvinyl resin.

4. The method of claim 1 wherein the metal sheet is carbon steel sheet.

5. A method of producing a coated sheet metal stock capable of being cold formed which comprises applying a thin coherent film of 0.001 to 0.0001 inch thickness of polyvinyl chloride resin to a carbon steel sheet, heating the film on the sheet briefly to its fusion temperature at 350° F. to fuse the film together and on to the sheet, then cooling the film to below its fusion temperature, next applying to said film a layer of 0.01 to 0.001 inch thickness of polyvinyl chloride resin and heating said layer briefly to its fusion temperature at 350° F. to accomplish mutual fusion of the layer and film, then cooling the layer to just below its fusion temperature, and finally pressure embossing the resinous coating at just below its fusion temperature without deforming the metal sheet.

References Cited in the file of this patent

UNITED STATES PATENTS

| | | |
|---|---|---|
| 2,030,066 | Jenett | Feb. 11, 1936 |
| 2,270,662 | Raney | Jan. 20, 1942 |
| 2,530,738 | Spessard | Nov. 21, 1950 |

FOREIGN PATENTS

| | | |
|---|---|---|
| 574,157 | Great Britain | Dec. 21, 1945 |